(12) United States Patent
Kormandel et al.

(10) Patent No.: US 11,276,241 B2
(45) Date of Patent: Mar. 15, 2022

(54) AUGMENTED REALITY CUSTOM FACE FILTER

(71) Applicant: Stayhealthy, Inc., Monrovia, CA (US)

(72) Inventors: Sagi Kormandel, Encino, CA (US); Anthony Lester Madden, Dallas, TX (US); Colin Kenneth Hill, San Dimas, CA (US)

( * ) Notice: Subject to any disclaimer, the term of this patent is extended or adjusted under 35 U.S.C. 154(b) by 0 days.

(21) Appl. No.: 17/155,352

(22) Filed: Jan. 22, 2021

(65) Prior Publication Data

US 2021/0225086 A1    Jul. 22, 2021

Related U.S. Application Data

(60) Provisional application No. 62/964,193, filed on Jan. 22, 2020.

(51) Int. Cl.
*G06T 19/00* (2011.01)
*G06K 9/00* (2022.01)
*G06T 19/20* (2011.01)

(52) U.S. Cl.
CPC ........ *G06T 19/006* (2013.01); *G06K 9/00281* (2013.01); *G06T 19/20* (2013.01); *G06T 2200/24* (2013.01); *G06T 2219/2012* (2013.01); *G06T 2219/2021* (2013.01)

(58) Field of Classification Search
CPC ... G06T 19/006; G06T 19/20; G06T 2200/24; G06T 2219/2012; G06T 2219/2021; G06K 9/00281
See application file for complete search history.

(56) References Cited

U.S. PATENT DOCUMENTS

| | | | |
|---|---|---|---|
| 8,982,110 | B2 | 3/2015 | Saban et al. |
| 2014/0043329 | A1 | 2/2014 | Wang et al. |
| 2018/0278879 | A1* | 9/2018 | Saban ...................... G06K 9/00 |
| 2020/0082595 | A1* | 3/2020 | Okada ..................... G06T 15/80 |

* cited by examiner

*Primary Examiner* — Chong Wu
(74) *Attorney, Agent, or Firm* — Zarley Law Firm, P.L.C.

(57) ABSTRACT

An augmented reality face filter mask system having an application adapted to be down loaded to a personal electronic device wherein the application includes a plurality of preset templates and a plurality of stored template sections that are adapted for selection to create a form fitting augmented reality mask on a face captured in video. The application also includes tools that include a color palette providing a plurality of color options, a brush tool providing size and shape options, and a camera tool.

10 Claims, 1 Drawing Sheet

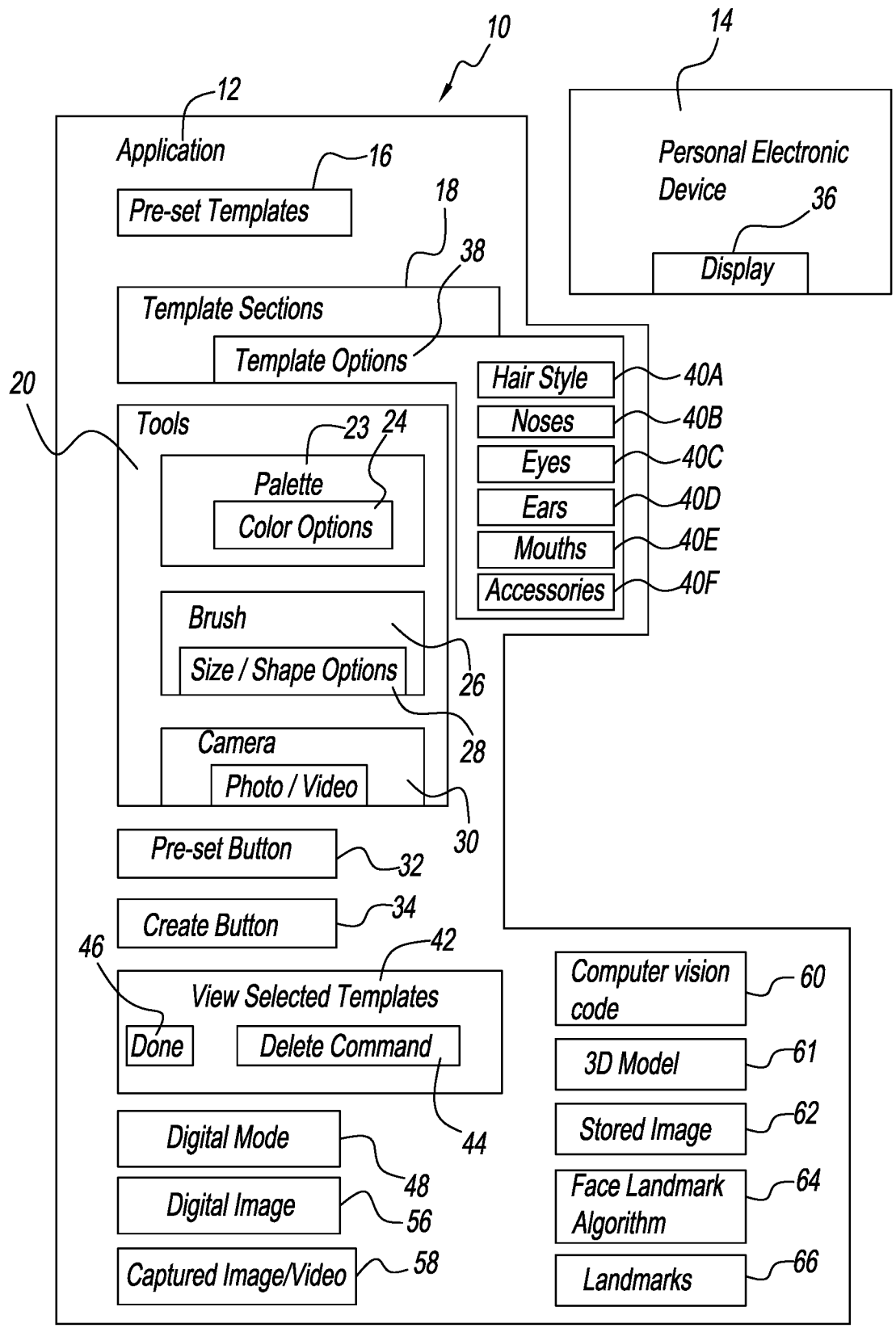

AUGMENTED REALITY CUSTOM FACE FILTER

CROSS REFERENCE TO RELATED APPLICATION

This application claims the benefit of U.S. Provisional Application No. 62/964,193 filed Jan. 22, 2020, the contents of this application are hereby incorporated by reference in their entirety.

BACKGROUND OF THE INVENTION

The present invention is directed to an application for creating an augmented reality face filter, and more particularly an application for creating a custom form fitting augmented reality mask.

Existing approaches to computer implemented face and avatar technology provide solutions where user interaction of a face is based on a 2D image, video, 3D face filters, and avatars. While useful, existing approaches to computer implemented face and avatar technology provide solutions where the user interaction with the face mask and the face filter are locked, and doesn't allow users to customize or edit to fit their creative needs. Another existing approach currently being implemented allows users to create face masks and face filters but requires users to know how to 3D model, animate, and manipulate pixels to achieve a desired face filter or face mask. Performing the previously stated creation and editing techniques requires a powerful personal computer to run the necessary software. While current solutions are useful, it alienates consumers who lack the knowledge, money, and resources to create a face filter and/or face mask on their own. In particular, a form fitting mask that is customized through coloring tools and/or through the selection of a plurality of template sections is not known. Accordingly, an application is needed that addresses these deficiencies.

An objective of the present invention is to provide an augmented reality face filter mask system that is form fitting.

Another objective of the present invention is to provide an augmented reality face filter mask system that is customized through coloring tools and/or the selection of a plurality of template sections.

These and other objectives will be apparent to those skilled in the art based upon the following written description, drawing and claims.

SUMMARY OF THE INVENTION

An augmented reality face filter mask system having an application adapted to be downloaded to a personal electronic device, wherein the application includes a plurality of preset templates and a plurality of stored template sections that are adapted for selection to create a form fitting augmented reality mask on a face captured in video. The application also includes tools that include a color palette providing a plurality of color options, a brush tool providing size and shape options, and a camera tool.

A preset click through button on a display presents the plurality of preset templates adapted for selection and a create click through button on a display that presents a plurality of template options adapted for selection. The plurality of template options include click through buttons for categories including hairstyles, noses, eyes, ears, mouths, and accessories. The click through button for a category displays the plurality of template sections related to the category and adapted for selection. The selected template sections are adapted to be viewed by selecting a view selected templates click through button on the display, deleted by selecting a delete command, and selecting a done command once all wanted template sections have been selected.

Once the preset template is selected a user is prompted by the application to select a digital mode where the user is presented with a set of tools to color the selected preset template to create a colored digital image. A face image is captured with the camera tool and using a computer vision code within the application the computer vision code aligns the colored digital image with the captured face image which is resized by the application, and applied to a three-dimensional model. Frames of the captured image are analyzed to identify facial features to create a group of landmark points using a facial landmark algorithm.

The group of landmark points are fit along a face and after calibrating the camera's matrix, the group of landmark points are extruded to a three-dimensional space and translation and rotation vectors are calculated by the application and applied to the three-dimensional model where the three-dimensional landmarks are extracted and applied to each corresponding point in a three-dimensional mesh, causing the mesh to morph in real time based on incoming data to create an AR mask. The AR mask is then saved. The AR mask may also be shared on social media.

BRIEF DESCRIPTION OF THE DRAWING

The Figure is a schematic view of an augmented reality face filter system.

DETAILED DESCRIPTION OF THE PREFERRED EMBODIMENTS

An augmented reality (AR) face filter or mask system 10 includes a downloadable application 12 for use with a personal electronic device 14 such as a mobile phone, personal computer, AR wearables or the like. The application includes a plurality of preset stored images or templates 16 and a plurality of stored template sections 18. The template sections 18 are for hairstyle, eyes, noses, ears, mouths, accessories and the like. The application 12 also has a plurality of tools 20 that include a color palette 22 providing a plurality of color options 24, a brush tool 26 providing size and shape option 28, and a camera tool 30.

Once downloaded, a user selects whether they wish to select a preset template 16 or create a template from a plurality of template sections 18 by selecting a preset click through button 32 or a create click through button 34 shown on a display 36 of the personal electronic device 14. By selecting the preset button 32 the user is presented with the plurality of preset templates 16 on the display 36. A preset template 16 is selected by physically engaging the preset template 16 on the display 36.

Alternatively, if the create button 34 is selected the user is presented with a plurality of template options 38. The template options 38 include a plurality of click through buttons 40 for various categories such as hairstyles 40A, noses 40B, eyes 40C, ears 40D, mouths 40E, and accessories 40F. By selecting one of the click through buttons 40A-40F the application 12 will display a plurality of template sections 18 related to the button's 40A-40F category. For example, if button 40B is selected the application will display a plurality of nose template sections 18.

A template section 18 is selected by physically engaging the template section 18 on the display 36. The creation process is repeated until the user has selected all wanted template sections 18. The user can view the selected template sections in progress and delete and reselect template sections 18 by selecting a view selected templates click through button 42, selecting a template section 18 on the display, and selecting a delete command 44. Once all wanted template sections 18 have been selected, the user selects a done command 46.

Once a preset template 16 is selected or a template is created the application 12 prompts the user to select a digital mode 48. If the digital mode 48 is selected the application 12 provides the user with a set of tools 20 that include the color palette 22 and the brush tool 26. By selecting the brush size and shape 28 and a color option 24, the user colors in portions of the selected/created template on the display 36.

Upon completion of the coloring and/or scanning of the selected/created template, which creates a colored digital image 56, the user activates the camera tool 30 and captures a photo or video 58 of themselves or others.

Using a computer vision code 60 within the application 12, the code 60 aligns the colored digital image 56 with a face that is captured in a live or prerecorded video 58. Then the colored digital image 56 is resized by the application 12 and applied to a three-dimensional model 61 associated with the stored image 62.

Once applied, each frame of the captured image 58 is analyzed to identify facial features wherein a facial landmark algorithm 64 is run in the location of the facial features to present a group of landmark points 66 that outline the face. The landmark points 66 are then fit along the face to provide a more accurate result. After calibrating the camera's matrix, the landmark points 66 are extruded to a three-dimensional space and translation and rotation vectors are calculated from the data by the application and applied to the three-dimensional model 61. The three-dimensional landmarks are extracted and applied to each corresponding point in a three-dimensional mesh causing the mesh to morph in real time based on incoming data.

After the application has tracked the selected/created template on the face of the captured photo to create an AR mask the user is able to save and store the AR mask within the application 12 by selecting a save command. Saved AR masks can be loaded from storage by selecting a load command from the application 12. The user can also capture photos and videos while viewing the AR mask and share on social media channels, email, SMS text, or save on their personal electronic device 14 in order to share at a later time. All videos and photos can be watermarked or branded with any logo, message, or graphic.

Therefore, a system 10 has been disclosed that provides a customized formfitting mask, and improves upon the art.

From the above discussion and accompanying FIGURE and claims it will be appreciated that the system 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. An augmented reality face filter mask system, comprising:
    a personal electronic device having a camera and a display;
    an application downloaded to the personal electronic device;
    wherein the application includes a plurality of preset templates and a plurality of stored template sections that are adapted for selection to create a form fitting augmented reality mask on a face captured in video;
    wherein when one of the plurality of preset templates is selected a user is prompted by the application to select a digital mode where the user is presented with a set of tools to color the selected preset template to create a colored digital image;
    wherein a face image is captured with the camera using a camera tool and using a computer vision code within the application the computer vision code aligns the colored digital image with the captured face image, which is resized and applied to a three-dimensional model by the application, applied to a three-dimensional model; and
    wherein the group of landmark points are fit along a face and after calibrating the camera's matrix the group of landmark points are extruded to a three-dimensional space and translation and rotation vectors are calculated by the application and applied to the three-dimensional model where the three-dimensional landmarks are extracted and applied to each corresponding point in a three-dimensional mesh causing the mesh to morph in real time based on incoming data to create an AR mask.

2. The system of claim 1 wherein the application includes tools that include a color palette providing a plurality of color options, and a brush tool providing size and shape options.

3. The system of claim 1 wherein the application includes a preset click through button on the display that presents the plurality of preset templates adapted for selection.

4. The system of claim 1 wherein the application includes a create click through button on the display that presents a plurality of template options adapted for selection.

5. The system of claim 4 wherein the plurality of template options include click through buttons for categories including hairstyles, noses, eyes, ears, mouths, and accessories.

6. The system of claim 5 wherein the selection of the click through button for a category displays the plurality of template sections related to the category and adapted for selection.

7. The system of claim 6 wherein the selected template sections are adapted to be viewed by selecting a view selected templates click through button on the display, deleted by selecting a delete command, and selecting a done command once all wanted template sections have been selected.

8. The system of claim 1 wherein frames of the captured image are analyzed to identify facial features to create the group of landmark points using a facial landmark algorithm.

9. The system of claim 1 wherein the AR mask is saved.

10. The system of claim 1 wherein the AR mask is shared on social media.

* * * * *